May 20, 1941.  G. P. HEINER  2,242,521
REMOVABLE SNELLESS FLY BOX
Filed June 20, 1936
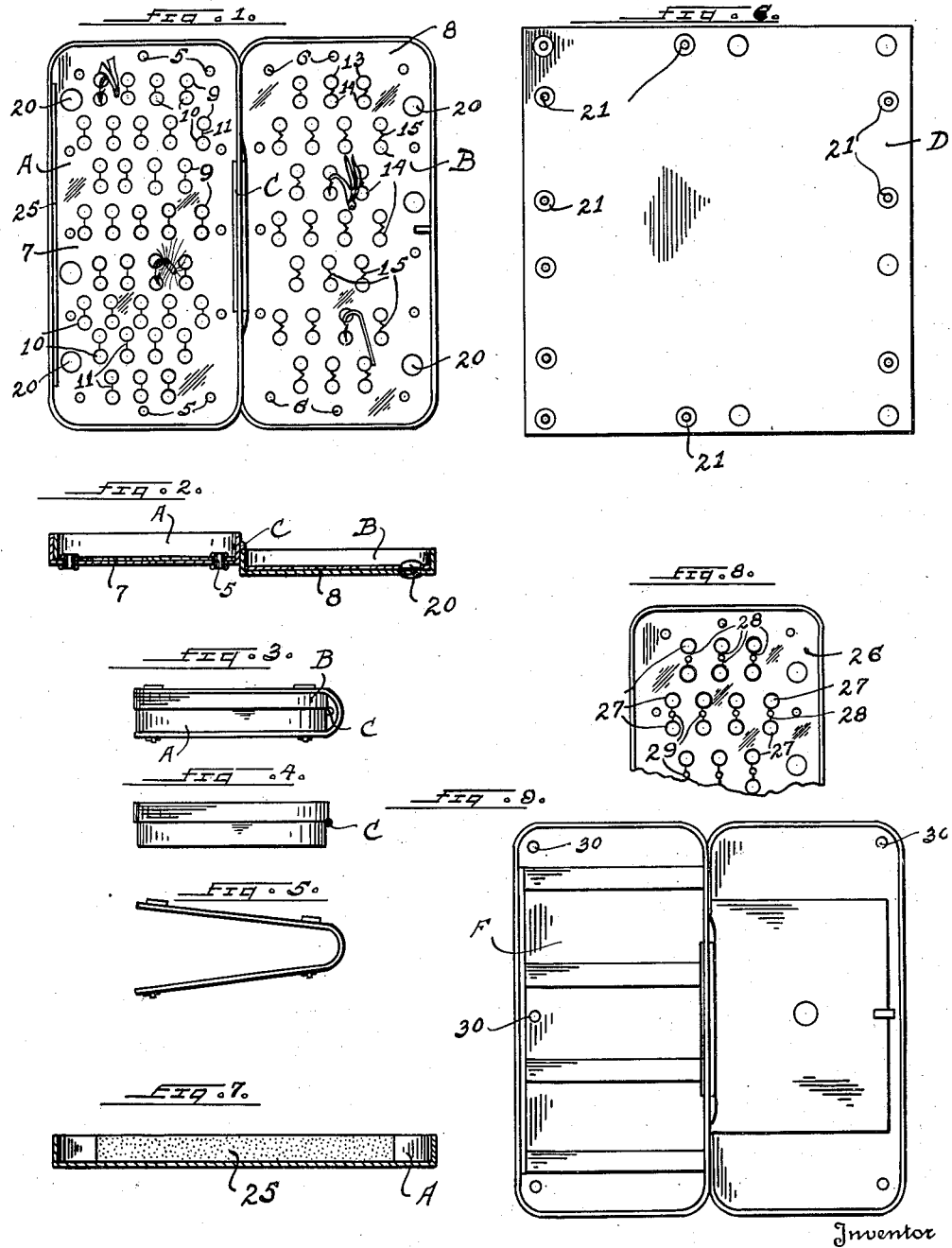
Inventor
Glen P. Heiner
By R. M. Thomas
Attorney Patented May 20, 1941

2,242,521

UNITED STATES PATENT OFFICE 2,242,521

REMOVABLE SNELLESS FLY BOX

Glen P. Heiner, Salt Lake City, Utah

Application June 20, 1936, Serial No. 86,215

3 Claims. (Cl. 43—32)

My invention relates to receptacles in which snelless hooks are carried and has for its object to provide a new and efficient snelless fly receptacle having new means of holding the hooks and said receptacle being provided with suitable snap fasteners to be used to hold the receptacle in a removable leaf, for use in a build up fly book for fishermen.

A further object is to provide a Pyralin, a metal, or a flexible yielding material or a Celluloid base for a snelless fly hook or hook book in which the Pyralin is perforated in certain predetermined manner and the hooks engaged under the Pyralin or other material through said perforations.

A still further object is to provide a removable fly receptacle for a build up book for fishermen such as is set out in my co-pending application for fly books filed in the United States Patent Office under Serial No. 86,219, for Build up fly books for fishermen, filed June 20, 1936, and which fly receptacle is provided with suitable snap fasteners to secure the receptacle to a leaf which leaf in turn is provided with similar fasteners to secure the leaf in the main book.

A still further object is to provide a new holding medium for hook boxes for snelless hooks such as are used by dry fly fishermen which receptacle has the usual space therein to allow for hooks to be placed both in the bottom of the receptacle and in the lid or cover and the two hingedly connected to make a closed receptacle and with the new holding medium secured rigidly in the bottom and in the cover of the receptacle.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a plan view of my receptacle shown opened looking down into both the bottom or base of the receptacle and into the lid.

Figure 2 is a section transversely of the receptacle and cover or lid.

Figure 3 is an end view of the receptacle closed and inserted into the removable leaf.

Figure 4 is an end view of the closed receptacle removed from the leaf.

Figure 5 is an end view of the leaf with the receptacle removed therefrom.

Figure 6 is a plan view of the removable leaf showing the snap fasteners used therein.

Figure 7 is a section longitudinally of the receptacle showing a piece of emery paper inserted into the edge of the receptacle on which dull hooks may be repointed and sharpened.

Figure 8 is a plan view of a portion of one side of the receptacle showing a modified form of perforating the Pyralin or Celluloid.

Figure 9 shows a common type of fly receptacle with my snap fasteners secured therein illustrating the adaptability of using any receptacle in my removable leaf and in my build up fly book.

In the drawing I have shown the bottom or base of the receptacle A, the lid or cover as B, and the hinge connecting the two together as C. Into the bottom of the cover and into the bottom of the base I then secure two flat sheets of perforated Pyralin or Celluloid or like material by rivets 5 and 6. The sheets 7 secured by the rivets 5 in the bottom of the base or receptacle A is perforated by holes 9 and 10 with a slit or cut 11 joining the two holes together. The sheet 8 secured by the rivets 6 in the cover B is provided with spaced apart holes 13 and 14 joined together by a V-shaped cut or slit 15. This provides the means in which the hooks are inserted and held. The rivets are so spaced apart as to hold the Pyralin in close or smooth contact with the cover or receptacle and the hooks are passed in through the holes as shown with the end of the hook either extending out the other hole or engaged under the Pyralin between the Pyralin and the bottom of the receptacle or cover. The base and cover of the receptacle are each provided with female snap fasteners 20 and a flexible leaf D shown in Figure 6 is provided with male snap fasteners 21 which are adapted to fit and be inserted in the female fastener to hold the receptacle in fixed relation on the removable leaf. The leaf is also provided on one outer surface with male snap fasteners and on the other side with female snap fasteners by which the leaf is secured in my build up book as set out in my copending application mentioned hereabove.

In Figure 7 I have shown a strip of emery paper or suitable sharpening medium 25 secured in the book by glue and on which the hooks may be sharpened.

In Figure 8 I have shown a modified sheet of Pyralin 26 in which spaced apart openings 27 are formed with the openings of nearly equal size and spaced apart by slits 28 which are in turn spaced apart by a smaller opening 29. Thus the hooks may be inserted through one large opening into the small opening 29 and held in fixed position thus providing more surface in which hooks may be retained.

In Figure 9 I have shown a fly receptacle F of one of the types now on the market with said receptacle provided with snap fasteners 30 of the female type secured therein by which this receptacle F may be secured in and carried within the removable leaf D.

The material used for sharpening the hooks may be carborundum, emery cloth, a thin file or other suitable material.

The operation of this receptacle and its retaining mediums is obvious.

Having thus described my invention I desire to secure by Letters Patent and claim:

1. In a receptacle for snelless flies, the combination of a receptacle and cover therefor and a single sheet of perforated flexible material mounted in the flat surface of said receptacle and cover.

2. In a fly receptacle for build up fly books the combination of a hook receptacle; snap fasteners mounted therein to allow for insertion in a fly book; a leaf having like fasteners therein into which the receptacle may be secured; means to attach the leaf to the fly book; and means in said receptacle to hold flies.

3. A fly box of the class described, comprising a rectangular receptacle having vertical walls; a cover to fit down over said receptacle hingedly connected thereto; snap fasteners secured through the four corners of both the receptacle and cover; a sheet of flexible material having snap fasteners secured therein spaced to fit the fasteners of the receptacle and lid into which sheet the entire box may be secured and easily removed therefrom; sheets of thin Pyralin riveted to the bottom of the receptacle and cover; rows of pairs of perforations through said sheets, of equal diameters; and slots connecting pairs of said perforations together to receive the point of the hook through one perforation and out through the other of the pair, the slit to permit pulling the hook from the perforations without having to withdraw it through the perforation.

GLEN P. HEINER.